Patented Jan. 24, 1928.

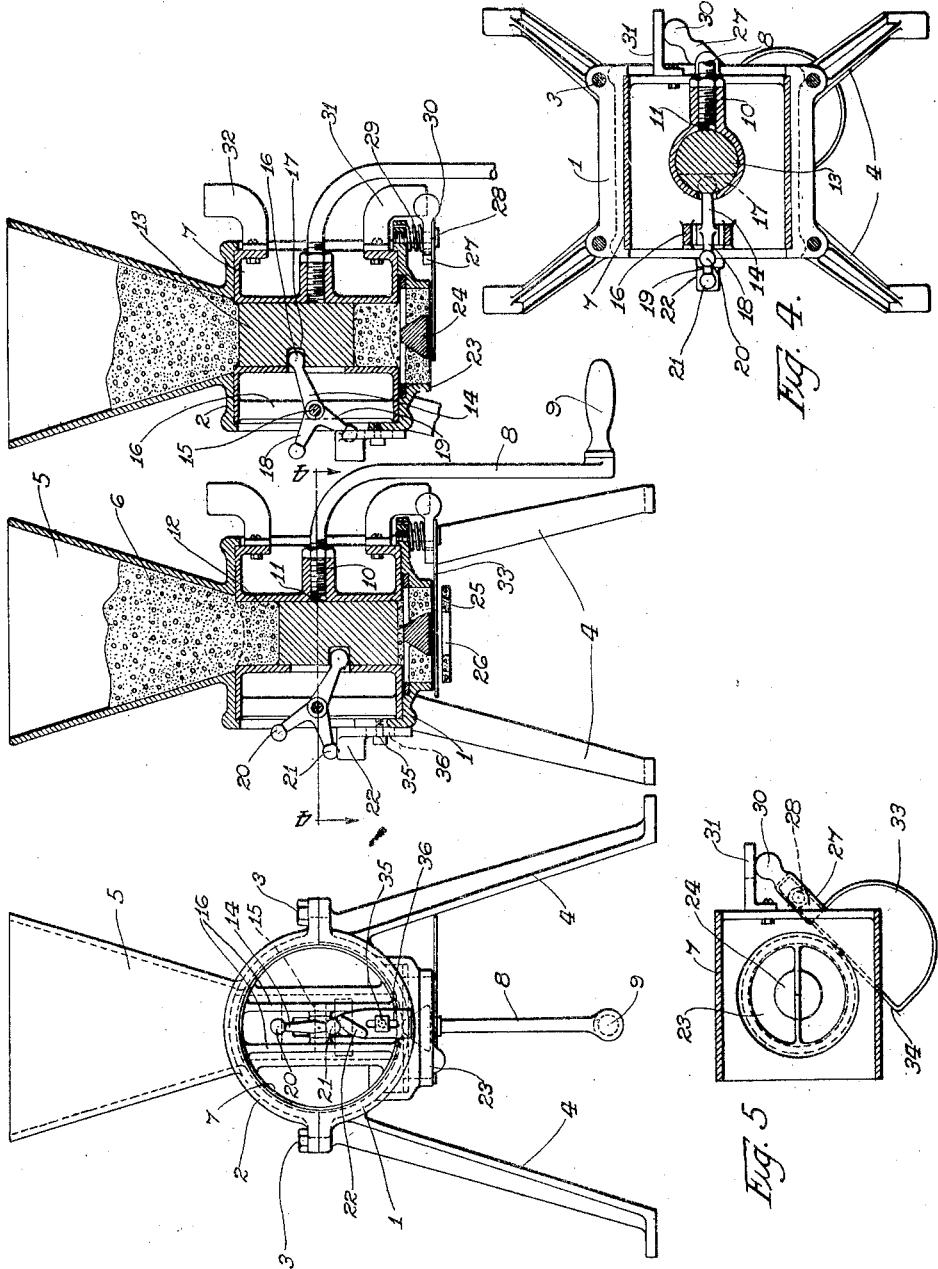

1,657,276

UNITED STATES PATENT OFFICE.

JOHN R. NYE, OF CHICAGO, ILLINOIS.

DOUGHNUT-CUTTING MACHINE.

Application filed January 20, 1921. Serial No. 438,622.

My invention relates generally to improvements in doughnut cutting machines, but relates more particularly to improvements in machines that are adapted for use by bakers, hotels, commissaries and the like where large numbers of doughnuts are made and where the elements of speed, accuracy, reliability and the like are elements to be considered.

In restaurants, hotels, commissaries and the like where large numbers of doughnuts are made the method generally followed is that known as the bag method. In this method a large quantity of dough is placed in a bag and batches thereof discharged by the hand manipulation of the operator. Considerable skill is required to operate under this method before doughnuts of approximately the same size can be made at a reasonably rapid rate. Unless the device is skillfully handled the doughnuts will vary in size, some being much larger than the desired size and others being much smaller. In practice this variable product results which is not only objectionable in itself but also causes waste of time and material. The reason for this is that the batch of doughnuts must be left in the lard or other medium a length of time sufficient to fry the largest doughnut which is somewhat longer than is necessary to fry a doughnut of the desired size, and much longer than is necessary or desirable to fry the greatly undersized doughnut. Obviously there is a great resultant waste of lard or other frying medium employed.

The general object of my invention is to provide a machine wherewith doughnuts of like size may be cut quickly, accurately and without waste.

Another object of my invention is to provide a doughnut cutting machine which shall be simple, of durable and inexpensive construction, and one which can be operated without requiring any especial skill. I aim also to provide a doughnut cutting machine which shall be composed of relatively few parts and which shall have those parts with which the dough contacts so formed that they may be readily inspected and thoroughly cleansed.

A further object of my invention is to provide a doughnut cutting machine so formed that one batch of dough shall be discharging in the form of the cut doughnut, while another batch is filling by gravity into a measuring chamber for subsequent discharge.

My invention consists generally in a machine of the form, construction, arrangement, combination, and co-action of its parts whereby the above named objects, together with others that will appear hereinafter are attainable; and my invention will be more readily understood by reference to the accompanying drawings which illustrate what I consider, at the present time, to be the preferred embodiment thereof.

In said drawings:

Fig. 1 is a rear end elevation of a machine embodying my invention.

Fig. 2 is a transverse vertical sectional view of the machine.

Fig. 3 is a view similar to Fig. 2, but illustrating the position of the parts just prior to the ejection of the dough.

Fig. 4 is a transverse sectional view, substantially on the line 4—4 of Fig. 2; and Fig. 5 is a detail view of the cut-off mechanism.

The machine may be formed of stampings or castings, but, as here shown, is composed largely of castings. Thus it comprises a housing consisting of a lower semi-circular portion 1, and an upper semi-circular portion 2 which are secured detachably together, as by means of the bolts 3. The lower portion 1 is here shown as provided with legs 4 for the support of the devices as a whole and the upper portion with a hopper 5 for the reception and holding of a quantity of dough 6 from which the doughnuts are to be made. Mounted within the cylindrical housing formed by the casing members 1 and 2 is a sleeve-like cylindrical member 7 which is freely rotatable within the housing. For the purpose of rotating the sleeve 7 a crank 8 having a handle 9 is provided, the crank being secured to the sleeve as by means of the threaded end 10 entering the threaded boss 11. Thus by turning the crank the sleeve may be rotated. The sleeve 7 is provided with a central bore or opening 12 which is cylindrical in form and in which a plunger 13 is snugly fitted for sliding movement. The remaining parts of the machine will be more readily understood by a description of the operation.

A quantity of the suitably prepared dough 6 is placed in the hopper and, assuming that the parts are in the position shown in Fig. 3, but that no dough is at the lower end of the plunger 13, by turning the crank the plunger 13 is moved toward the opposite end of the bore 12. This movement of the plunger 13 is occasioned by means of a lever 14 which is mounted upon a pivot 15 carried in the cross webs 16 of the sleeve 7. The inner end of the lever 14 is of balled shape, as indicated at 16, and enters a recess 17 provided therefor in the plunger 13. The outer end of the lever 14 is bifurcated, thus providing two oppositely disposed arm portions 18 and 19 which terminate in the ball shaped ends 20 and 21. Since the lever 14 is carried on a pivot that is mounted in the sleeve it follows that the lever, as a whole, rotates with the sleeve. In doing so, the end 21 first contacts with the cam 22 which is carried by the fixed casing of the machine. This rocks the lever 14, thus moving the plunger toward the opposite end of the bore permitting the dough to fall, by gravity, into the part of the bore above the plunger. The dough quickly fills this space and continued rotation of the sleeve thus brings the dough filled part of the bore to the lower part of the machine, at which time the lever 14 has again rocked, this time throwing the dough outwardly through the discharge opening 23 in which is positioned a central conical die portion 24 which results in the ejection of an annulus of dough 25 having the typical doughnut opening 26. It should be stated that the dough is at first merely forced through the discharge die and there hangs until it is positively freed by the cut-off mechanism. The cut-off mechanism, as here shown, comprises a lever 27 which is mounted upon a vertical pivot 28 and which is returned to the inoperative position shown in Fig. 5, by means of a tortion spring 29. One end of the lever terminates in a ball shaped portion 30 which is engaged by lug members 31 and 32, affixed to the rotating sleeve, as they successively swing past the bottom part of the casing. The other end of the lever 27 is formed of a U-shaped portion 33 and a straight portion 34 that is preferably formed of fine wire. Thus as the lever 27 is swung the wire member 34 severs the dough and the completely severed doughnut falls through the opening provided by the U-shaped form of the portion 33, whereupon the lug member 31 or 32, as the case may be, having brushed past the projecting end portion 30 of the lever 27 permits the tortion spring to return the cutter to inoperative position. Thus after the first revolution—that is to say—after the machine is started and the discharge of doughnuts commenced two accurately and uniformly sized doughnuts are discharged per revolution of the sleeve. It will be observed that the machine is entirely automatic in so far as the functions of measuring and discharging, and cutting off the dough in the form of doughnuts is concerned. The size of the doughnut, i. e. its thickness may be varied, if desired, and to this end I have made the cam 22 adjustable to and from the axis of rotation of the sleeve 7, thereby causing a greater or lesser rocking movement of the lever 14 and the correspondingly greater or lesser movement of the plunger 13. The result is that more or less dough is discharged per operation, thus resulting in a doughnut of the desired size. The cam 22 is adjustably secured by means of the screw 35 which is accommodated in the elongated slot 36 of the body of the cam and which enters a suitable opening in the casing of the machine. The machine may be readily taken apart for cleansing by removing the bolts 3 and the pivot 15 at which time the casing parts may be separated, the lever 14 withdrawn and the plunger 13 entirely removed from its position in the bore 12, thus permitting free and complete access to all parts of the machine.

The machine which I have devised is capable of producing doughnuts very rapidly, produces doughnuts which are of desired uniform size and hence overcomes difficulties heretofore mentioned.

The many advantages characteristics of my machine will be apparent to those skilled in this art without further comment, but inasmuch as this disclosure will suggest to others modified constructions whereby the substantial objects and purposes of my invention may be attained, I do not wish to be limited to the specific construction herein shown and described except only as may be necessary by limitations in the hereunto appended claims.

I claim:

1. A doughnut forming machine comprising in combination, a housing having oppositely disposed inlet and discharge openings, a cylinder rotatively mounted in said housing and having a transversely disposed chamber therein adapted to register with said inlet and discharge openings, a reciprocating plunger in said chamber, a bell crank lever pivotally mounted on said cylinder and rotative therewith and including a plurality of arms, one of which is operatively connected to said plunger, and the others of which project beyond the end of said cylinder, and means mounted on the casing and adapted to be engaged by the said other arms of the bell-crank lever to cause the first mentioned arm to reciprocate said plunger to receive dough into said chamber and to discharge it therefrom.

2. A doughnut forming machine comprising in combination, a housing having oppositely disposed inlet and discharge openings, a cylinder rotatively mounted in said housing and having a transversely disposed chamber therein adapted to register with said inlet and discharge openings, a reciprocating plunger in said chamber, a device on said cylinder and rotative therewith and operatively connected to the plunger, a conical die member arranged in said discharge opening, means on said casing adapted to be engaged by said device to cause the same to reciprocate said plunger to receive dough into said chamber and to discharge it through said die, and means for severing the dough discharged through the die.

3. A doughnut forming machine comprising in combination, a housing having oppositely disposed inlet and discharge openings, a cylinder rotatively mounted in said housing and having a transversely disposed chamber therein adapted to register with said inlet and discharge openings, a reciprocating plunger in said chamber, a bell crank lever pivotally mounted on said cylinder and rotative therewith and including a plurality of arms, one of which is operatively connected to said plunger, a conical die member arranged in said discharge opening, means on said casing adapted to be engaged by the other arms of said lever to cause the same to reciprocate the plunger to receive dough into said chamber and to discharge it through said die, and means for severing the dough discharged through the die.

4. A doughnut cutting machine embodying therein a means providing a rotatable chamber having a plunger therein, feed and discharge passages leading to and from said chamber, a die member arranged in said discharge passage and in direct alignment with said chamber, and adjustable means for actuating said plunger to receive dough into said chamber and discharge it therefrom.

5. A doughnut cutting machine embodying therein a means providing a rotatable chamber having a plunger therein, feed and discharge passages leading to and from said chamber, a conical die member arranged in said discharge passage and in direct alignment with said chamber, and adjustable means for actuating said plunger to receive dough into said chamber and discharge it therefrom.

6. A doughnut forming machine comprising a casing having vertically aligned inlet and discharge openings therein, a dough hopper connected to said inlet opening, a horizontally disposed cylinder journalled in said casing and having a transverse chamber therein adapted to register with said inlet and discharge openings, a plunger reciprocable in said chamber, a device mounted on said cylinder and rotatable therewith and including a plunger engaging arm and power arms, and means on the casing adapted to be engaged by said power arms to impart a reciprocation to said plunger during the rotation of said cylinder.

7. A doughnut forming machine comprising a casing having vertically aligned inlet and discharge openings therein, a dough hopper connected to said inlet opening, a horizontally disposed cylinder journalled in said casing and having a transverse chamber therein adapted to register with said inlet and discharge openings, a plunger reciprocable in said chamber, a device mounted on said cylinder and rotatable therewith and including a plunger engaging arm and power arms, and means on said casing adapted to be engaged by said power arms to impart a reciprocation to said plunger during the rotation of said cylinder, said power arms and said last mentioned means being capable of a relative adjustment whereby the amount of reciprocation of the plunger may be determined.

8. A doughnut forming machine comprising a casing having vertically aligned inlet and discharge openings therein, a dough hopper connected to said inlet opening, a horizontally disposed cylinder journalled in said casing and having a transverse chamber therein adapted to register with said inlet and discharge openings, a plunger reciprocable in said chamber, a device mounted on said cylinder and rotatable therewith and including a plunger engaging arm and power arms, and a member adjustably secured to said casing and adapted to be engaged by the power arms to impart the desired reciprocatory stroke to said plunger.

9. A doughnut forming machine comprising a casing having vertically aligned inlet and discharge openings therein, a dough hopper connected to said inlet opening, a forming die mounted on the casing and associated with said discharge opening, a horizontally disposed cylinder journalled in said casing and having a transverse chamber therein adapted to register with said inlet and discharge openings, a plunger reciprocable in said chamber, a power transmitting device pivoted on the casing in a plane at a right angle to the plunger and having a part operatively engaged therewith and means on said casing adapted to be engaged by another part of said power transmitting device during the rotation of the cylinder for reciprocating the plunger.

10. A doughnut forming machine comprising a casing having vertically aligned inlet and discharge openings therein, a dough hopper connected to said inlet opening, a forming die mounted on the casing and associated with said discharge opening, a horizontally disposed cylinder journalled in said casing and having a transverse chamber therein adapted to register with said inlet and discharge openings, a plunger reciprocable in said chamber, a horizontally disposed cutter device, mounted on the casing and adapted for movement across the area of the die and means carried by the cylinder for actuating the cutter device in timed relation with respect to the position of said chamber in said casing.

11. A doughnut forming machine comprising a casing having vertically aligned inlet and discharge openings therein, a dough hopper connected to said inlet opening, a forming die mounted on the casing and associated with said discharge opening, a horizontally disposed cylinder journalled in said casing and having a transverse chamber therein adapted to register with said inlet and discharge openings, a plunger reciprocable in said chamber, a cutter device swingable horizontally across the area of said die and including a contact arm, and a device mounted on the cylinder for engaging said arm to swing said cutter device.

12. A doughnut forming machine comprising a casing having vertically aligned inlet and outlet opening, a dough hopper connected to said inlet opening, a cylinder journalled in said casing, flanges on said casing for holding said cylinder in place, said cylinder having a transverse chamber therein adapted to register with said openings, a forming die carried by the casing in line with the discharge opening, a cutter associated with and below the die, a plunger reciprocable in said chamber, means carried by the cylinder and operatively connected to the plunger, a member on one end of the casing to be engaged by a part of said last mentioned means for imparting movement to said plunger and devices on the opposite end of the cylinder operable in the rotation thereof for actuating the cutter.

13. A doughnut forming machine comprising a two part casing, one of said parts including a hopper and an inlet opening, and the other part including supporting legs and an outlet opening, each of said casing parts having semi-annular end flanges, a cylinder rotative in said casing and engaged with said flanges, said cylinder having a transverse chamber therein, a plunger reciprocable in said chamber, a forming die associated with said discharge opening and means for actuating the plunger in timed relation with respect to the rotation of said cylinder.

In testimony whereof, I have hereunto set my hand, this 14th day of January, 1921.

JOHN R. NYE.